United States Patent [19]

Yoshida

[11] 4,216,638
[45] Aug. 12, 1980

[54] WRAPPING MACHINE

[75] Inventor: Toshio Yoshida, Kanagawa, Japan

[73] Assignee: Toyo Syokuhin Kikai Kabushiki Kaisya, Kanagawa, Japan

[21] Appl. No.: 895,226

[22] Filed: Apr. 10, 1978

[30] Foreign Application Priority Data

Mar. 3, 1978 [JP] Japan .................................. 53-24670

[51] Int. Cl.² ............................................ B65B 51/18
[52] U.S. Cl. ..................................... 156/466; 53/379;
156/583.3; 219/243; 53/550
[58] Field of Search ................... 53/552, 550, 551, 555,
53/373, 379; 219/243, 155, 583.5; 156/583

[56] References Cited

U.S. PATENT DOCUMENTS

| 2,556,008 | 6/1951 | Spalding | 219/243 |
|---|---|---|---|
| 3,367,261 | 2/1968 | Kashiwagi | 219/243 X |
| 3,381,443 | 5/1968 | Copping | 53/550 X |
| 3,553,933 | 1/1971 | Seko | 53/550 |
| 3,672,120 | 6/1972 | Heinzer | 53/550 |

Primary Examiner—Horace M. Culver
Attorney, Agent, or Firm—Donald D. Mon

[57] ABSTRACT

A wrapping machine has a heat sealing band running horizontally forward along a feed passage which lies in front of a former which forms a strip piece of film into a tube. The heat sealing band is put on a pair of electrode pulleys, and its upper portion between a pair of the electrode pulleys which runs along the feed passage is charged with electricity directly through a pair of the electrode pulleys.

3 Claims, 12 Drawing Figures

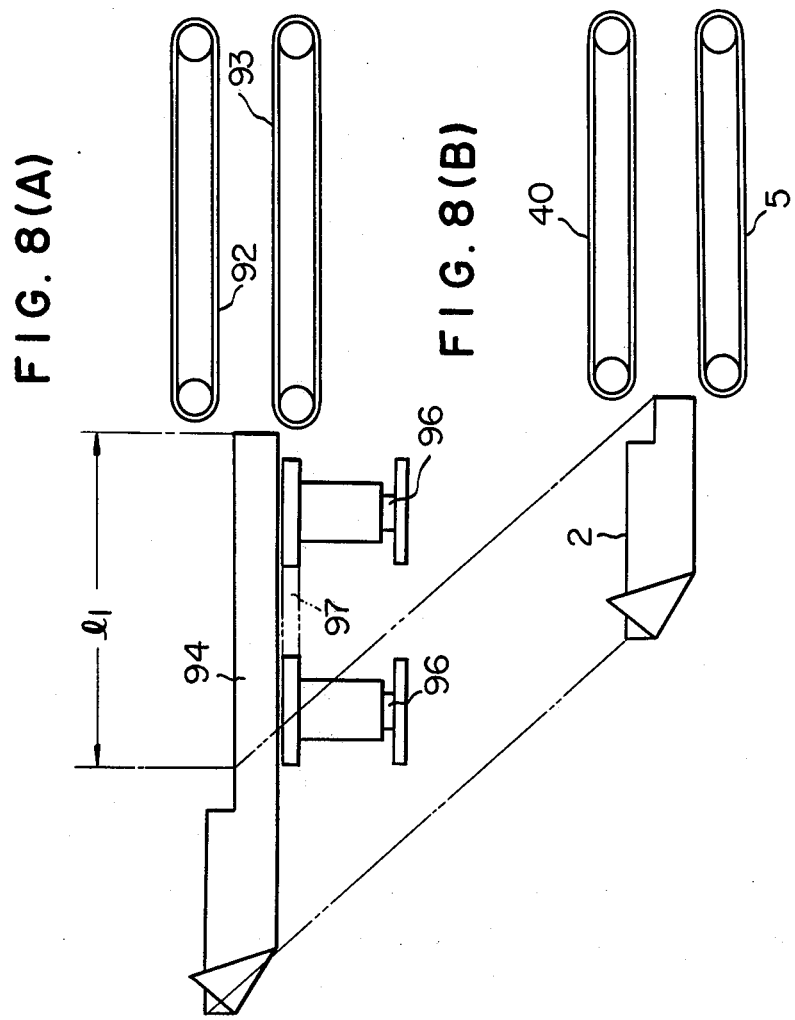

WRAPPING MACHINE

BACKGROUND OF THE INVENTION

This invention relates to a wrapping machine, and more particularly to a wrapping machine in which seam sealing of wrapping films at its both sides can be done by means of a conductive band or wire (in the following, it is called "heat sealing band"), which is put on pulleys or wheels which are held to horizontal pivotal shafts.

Heretofore, as shown in FIG. 7A, the seam sealing of wrapping films at its both sides has been done by means of heat sealing wheels 91, and 91 which are held to vertical pivotal shafts. Herein reference numerals 92, and 93 designate grip belts for feeding film and article with nipping these, reference numeral 94 a former (machine which forms to give shape to the film).

However, in the case of a machine shown in FIG. 7A, there were defects that heat sealing wheels 91, and 91 contacted only a part of wrapping film in a very short time interval as shown at t1 in FIG. 6, so that the surface temperature of the heat sealing wheel should have been made higher. Therefore, in order to transmit heat to the seam sealed part of the wrapping film, the surface temperature thereof should have been made higher than the melting point m of packing film as shown with line 95 in FIG. 6. In the case of thick film or laminated film, the necessity for such high temperature was particularly important. These temperatures can be reduced by reducing the rotation speed of the heat sealing wheels 91, and 91. However, in that case, the efficiency became worse.

For the above mentioned reason, a machine in which heat sealing bands 97, and 97 are mounted about vertical shafts has been proposed. However, in that case, the length of the former and wrapping material became disadvantageously longer as shown by length $l_1$ in FIG. 8A.

As shown in FIGS. 7A and 8A, as the heating surfaces of heat sealing wheels 91, and 91 or that of heat sealing bands 97, and 97 was vertical, the heat sealing parts of two films should be put in such a shape as to put one's hands flat together. And the ends of the films whose ends were put in such a shape as to put one's hands flat together projected slightly out of a space between two boards 98 as shown in FIG. 5C, in such a degree that the ends of the films can be held between heat sealing wheels 91, and 91, or heat sealing band 97, and 97, shown by length $l_2$, the length $l_2$ is larger than length $l_3$ of the present invention shown in FIG. 5B, so that films of considerable length were necessary and thereby a part of the films was wasted. And it was necessary to arrange a bearing member facing the heat sealing band. Further, when placing the films whose ends were put in such shapes as to put one's hand flat together along an external form of an article, another folding machine for folding films whose ends were put in such shapes as to put one's hands flat together should have been arranged behind the heat sealing band.

Further, in a conventional machine, as above mentioned, heat sealing wheels 91, and 91 or heat sealing bands 97, and 97 were held to vertical shafts 90, and 90, or vertical shafts 96, and 96, in which heating surface of heat sealing wheels 91, and 91 or that of heat sealing bands 97, and 97 were rotated about vertical axes. Therefore, it was impossible to place conveyers for transferring packages, that is, grip belt 92, and 93 along heat sealing wheels 91 or heat sealing bands 97. Therefore, grip belts 92, and 93 which consist of a pair of conveyers for transferring articles cannot have been arranged along heat sealing bands, and should be provided at the place determined according following process. Therefore, the total length of machine became longer than length l, and $l_1$ as shown in FIGS. 7A and 8A.

Further in the conventional machine, as the heat sealing band contacted with only the sealing part of the films whose ends were put in such shapes as to put one's hands flat together with pressure between the heat sealing bands, or between a heat sealing band and a bearing board acting on the sealing part, the feeding direction of the wrapping was unstable, and therefore it was necessary to provide a guide plate for correcting at both sides.

On the other hand, in constructing a heat sealing band, it was common that the electrically insulating section was made longer than the electrically conducting section, and thereby useless electric transmission was lessened to the utmost, so as to transmit effective maximum power. However, in the conventional machine, as the heat sealing band was put on wheels held to vertical shafts, for making a longer electrically insulating section of the heat sealing band, it was necessary to extend the length of the heat sealing band in the lateral direction. But, in that case, there were mounting and safety problems, by which an electrically insulating section cannot be longer without some restriction, and therefore there was a disadvantage that the length of the electrically insulating section was itself restricted.

BRIEF SUMMARY OF INVENTION

Accordingly, it is an object of the present invention to provide a wrapping machine in which the shape of the sealing seam can be freely selected from either a seal in such a shape as to put one's hands flat together as shown in FIG. 5B or a lapping seal as shown in FIG. 5A, and it is possible to shorten the length of the facing sealing parts of the films, especially when folding films which are to be sealed in such a shape as to put one's hands flat together. According to the specification its purpose can be sufficiently attained only by selecting the shape of the bottom of the former.

It is another object of the present invention to provide a wrapping machine in which pulleys or wheels which are held to horizontal pivotal shafts, a heat sealing band is horizontally applied thereon and conveyers for feeding packages are run with the heat sealing band, and a press belt is provided above the conveyers, and a grip belt is comprised of the conveyers and the press belt, whereby the total length can be shortened by length l or $l_1$ as shown in FIGS. 7B or 8B.

It is a further object of the present invention to provide a wrapping machine in which a grip belt is set at the location of a heat sealing band, and therefore packages can be accurately held with the grip belt, and films can be certainly sealed with the heat sealing band, and orientation of articles is kept stable with the grip belt so that supplementary means such as a guide plate is unnecessary and thereby to that extent the device is simplified.

It is a further object of the present invention to provide a wrapping machine in which by making a heat sealing band contact with a heat sealing part of films for a long time ($t_2$ shown in FIG. 6), the films can be heat-sealed positively and efficiently at a comparative low temperature, and by passing an electric current through the heat sealing band, heat efficiency can be improved and the disadvantage of local temperature increase can be corrected.

It is a further object of the present invention to provide a wrapping machine in which by putting a heat sealing band horizontally on pulleys or wheels, the length of an electrically non-conducting section can be extended very far downward, and therefore the ratio of the electrically non-conducting section to the electrically conducting section can be increased enough so that it is possible to control current flow to avoid useless consumption of electricity by passing the electricity most effectively through the electrically conducting section of the heat sealing band.

Other and further objects, features and advantages of the invention will appear more fully from the following description.

BRIEF DESCRIPTION OF THE SEVERAL VIEWS OF THE DRAWING

In the drawing:

FIGS. 7A, 7B, 8A, and 8B are schematic illustrations comparing the length of a machine of the present invention with the length of a conventional machine.

DETAILED DESCRIPTION

Figure 1:
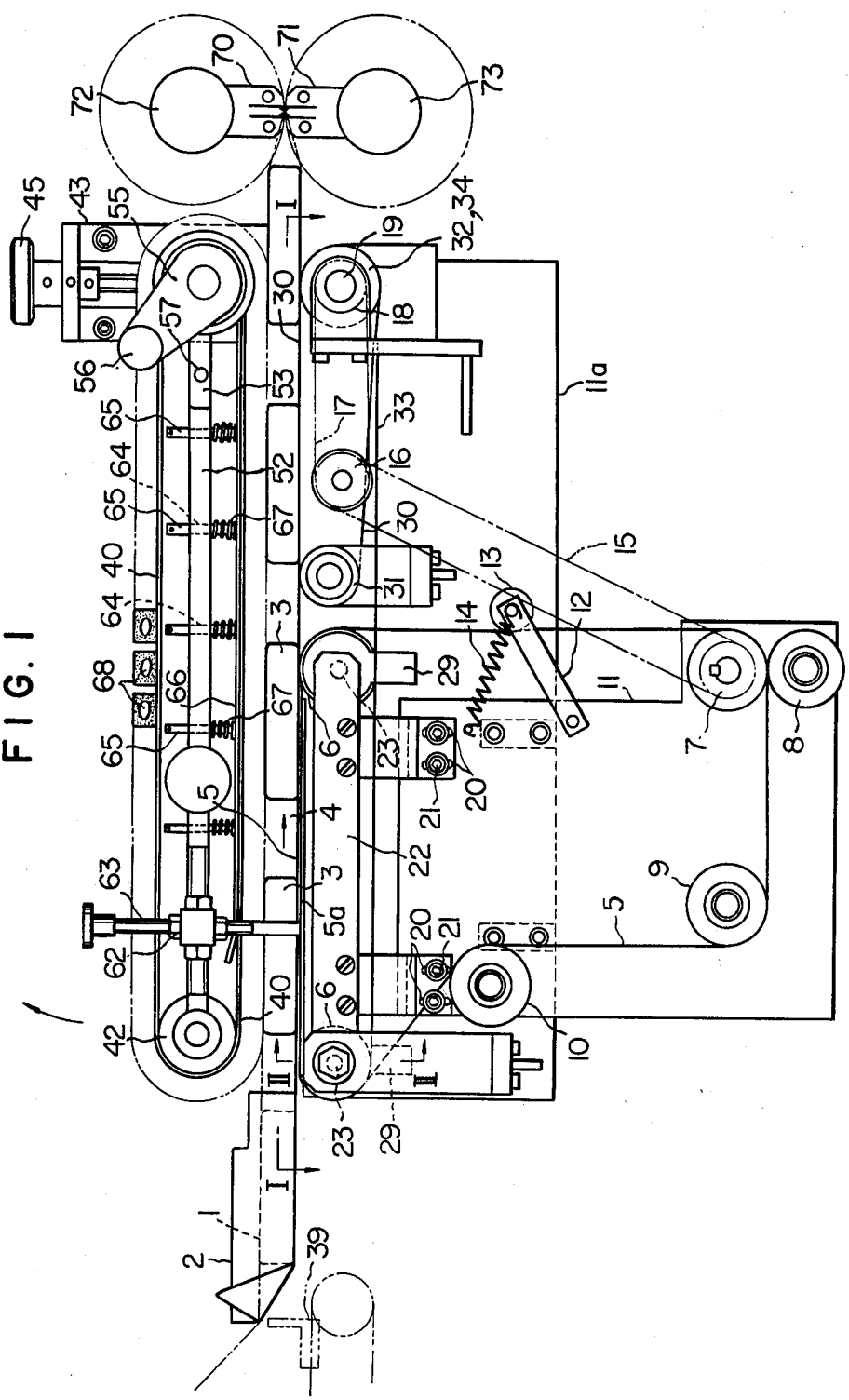
FIG. 1 is a side view of an embodiment of the present invention.

As shown in FIG. 1, a wrapping machine of this invention comprises a former 2 which forms a strip piece of film 1 into a tube-form and a feed passage 4 for feeding articles 3, 3, . . . at regular intervals, extending forward from the former 2. Under this feed passage 4, a heat sealing band 5, for example a band of stainless steel, is moved horizontally forward between a pair of electrode pulleys 6, and 6. The heat sealing band 5 is charged with electricity directly through the pair of the electrode pulleys 6, and 6. Down the heat sealing band 5, a supporting plate 5a of heat resisting insulation is fixed. The heat sealing band 5 goes around idler electrode pulleys 6, and 6, passing a space between a pair of driving pulleys 7, 8 constructed of insulation and idler pulleys 9, and 10 constructed of insulation. A part of the heat sealing band 5 is stretched by a tension pulley 13 which is carried by one end of a swing arm 12, and spring-loaded with a spring 14. The other end of the swing arm is rotatably mounted on a base 11, while one end thereof is connected through spring 14 with the base 11. The pulley 7 is connected with a motor (not shown) through a chain 15, a sprocket 16, a chain 17, a sprocket 18, and a shaft 19. Moreover, in FIG. 1, reference number 39 designates a dog for feeding articles 3, 3, . . . toward the former 2.

Figure 4:
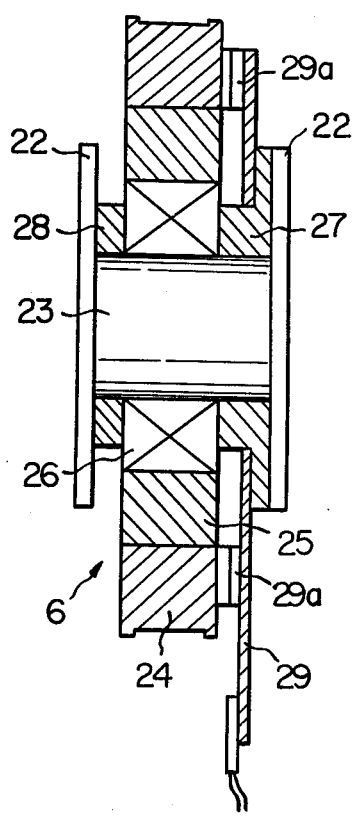
FIG. 4 is an expanded sectional view of an electrode pulley taken on line II—II in FIG. 1.

The electrode pulleys 6, and 6 are mounted rotatably on right and left ends of a supporting plate 22 set with bolts 21, 21 through elongated holes 20, 20. The position of horizontal shafts 23, and 23 carried by the supporting plate 22 is subject to vertical adjustment by reason of the elongated holes. As shown in FIG. 4, the above electrode pulleys 6 have a structure comprising an outer ring 24 consisting of conductor, an insulating ring 25 consisting of heat resisting insulative material such as fluoroplastic lapped inside the outer ring 24, and borne by a bearing 26 which touches with the above horizontal shaft 23, the components 24, 25 and 26 being held together as a unit. Between an inner face of the bearing 26 and one side of an end portion of the supporting plate 22, collars of heat resisting insulating material 27 and 28 are mounted, and on one collar 27, electrode plate 29 is set. The electrode plate 29 is provided with slip elements 29a, 29a, . . . which project from the electrode plate 29 toward the outer ring 24. The slip elements 29 are pressed against the outer ring 24, being in sliding contact with a side of the outer ring 24. The electrode plates 29, and 29 of the electrode pulleys 6, and 6 are electrically connected with electric power (not shown).

Figure 2:
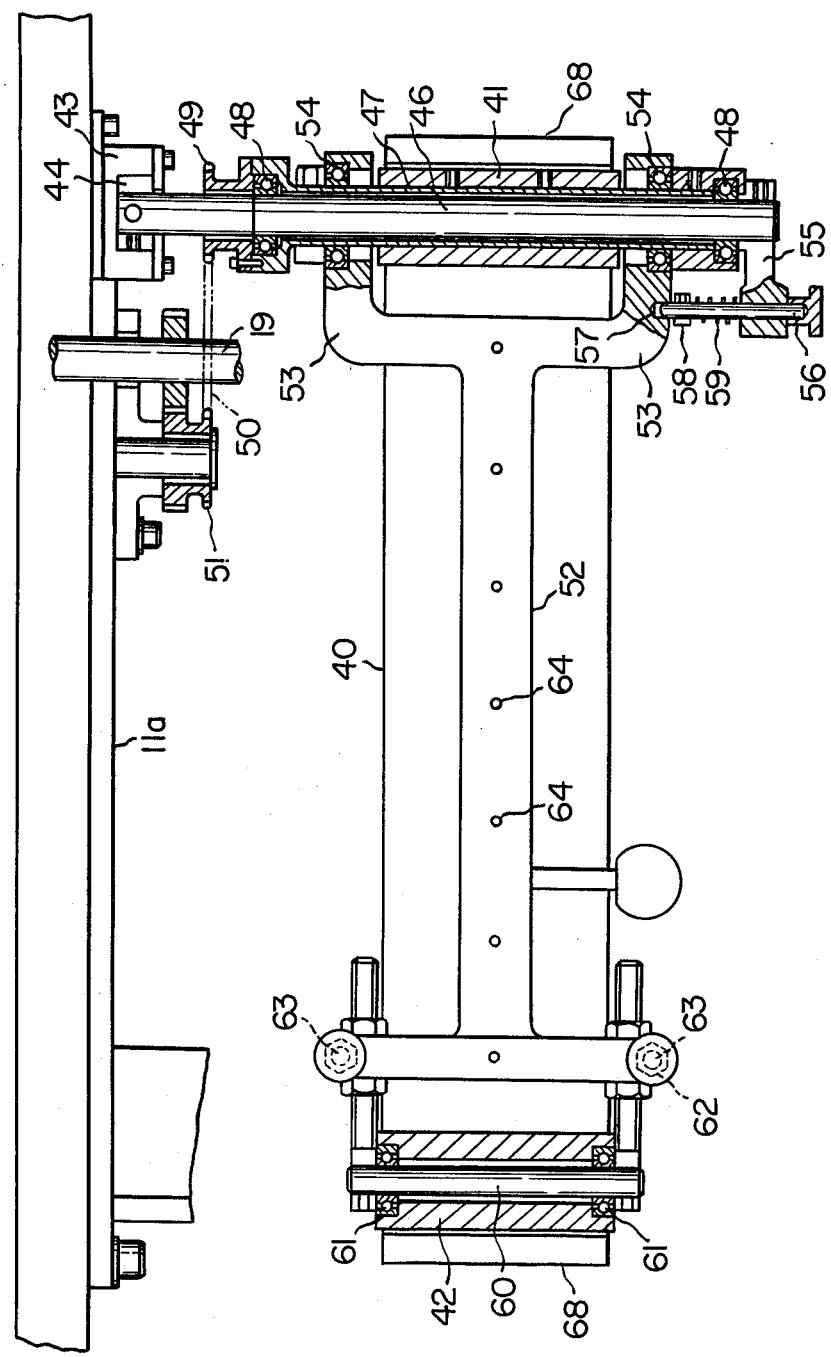
FIG. 2 is a plan view of details of a portion of the embodiment seen in FIG. 1.
Figure 3:
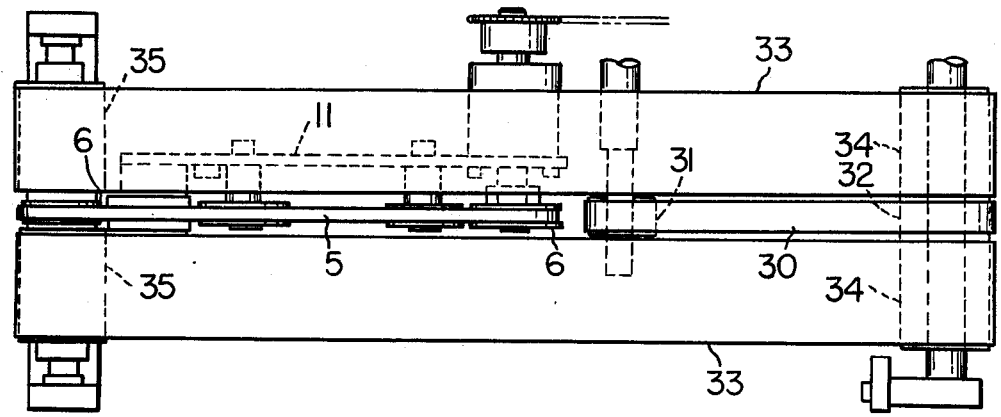
FIG. 3 is a plan view taken in the direction of the arrows along line I—I of FIG. 1.

As shown in FIGS. 1 through 3, in front of the heat sealing band 5, there is arranged a belt 30 which is somewhat wider than the heat sealing band 5, and is put on pulleys 31, and 32. Further, on both sides of heat sealing band 5 and belt 30, wide receiving belts 33, and 33 are put on pulleys 34, 35, 34, and 35.

As shown in FIGS. 1, and 2, above the heat sealing band 5 and belt 30, and receiving belts 33, and 33, there is arranged a wide press belt 40, which is put on pulleys 41, and 42. As shown in FIGS. 1, and 2, on a side part of the base 11a, a guide pillar 43 is held vertically. In the guide pillar 43, there is inserted a block 44 whose position can be adjusted vertically with an adjusting knob 45. On the block 44, a supporting shaft 46 is held horizontally. As shown in FIG. 2, a cylindrical shaft 47 which supports the pulley 41 is rotatably mounted on the supporting shaft 46 through bearings 48, and 48. The cylindrical shaft 47 is connected with a motor (not shown), through a sprocket wheel 49, chain 50, sprocket wheel 51, and shaft 19. As shown in FIG. 2, forked ends 53, and 53 of supporting beam 52 are rotatably supported on the cylindrical shaft 47, through bearings 54, and 54. An arm 55 attached to the end of the supporting shaft 46 is held by a pin 56 slidably inserted in a hole 57 in the adjacent forked end 53. The pin 56 is spring-loaded by a compression spring 59 which is inserted between a flange 58 on the pin 56 and the arm 55, in the direction which urges the pin 56 into the hole 57. On the other end of supporting beam 52, a shaft 60 is held, and on the shaft 60, pulley 42 is rotatably mounted through bearings 61, and 61. The supporting beam 52 is provided with nuts 62 which are arranged in the lengthwise direction, and in each nut there is inserted a threaded bar whose lower end is brought into contact with a receiving plate (not shown) which is held on the base 11a. The supporting beam 52 is provided with vertical holes in the center thereof, and in these vertical holes 64, 64 . . . bars 65 are slidably inserted. On lower ends of these bars 65, 65, . . . there is held a plate 66 which presses against a lower face of the press belt 40. The plate 66 is spring-loaded downwardly through springs 67, 67, . . . which are mounted about respective bars 65, 65, . . . Herein, reference numeral 68 designates many cylindrical supports of pliable elastic material which are held in parallel with each other in the transverse direction.

As shown in FIG. 1, in front of the above-mentioned feed passage 4, bottom sealers 70, 71 are mounted on rotary shafts 72, and 73 so as to rotate with the shafts.

The operation of the above-mentioned machine is explained as follows. Press belt 40, when it is not used, is held in the oblique upward direction by putting pin 56 of arm 55 in hole 57. However, if pin 56 is pulled out from hole 57 against spring 59, the supporting beam 52 and press belt 40 which is put on an outer side of the supporting beam, will be turned about the shaft 46 in the downward direction by action of its self-weight, and press on the heat sealing band 5, articles 3, 3 . . . on belts 30, 33, and 33, and films 1 which are folded into a tube-form. However, if threaded bars 63 are turned, the position of the vertical direction of press belt 40 can be adjusted, and the pressing force in the downward direction can be adjusted.

Figure 5A:
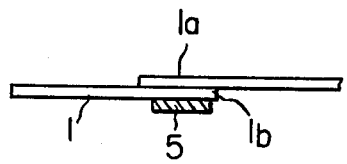
FIGS. 5A and 5B are schematic illustrations of illustrative examples of sealed portions.
Figure 5B:
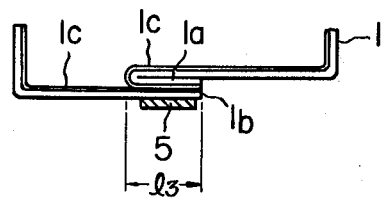
Figure 5C:
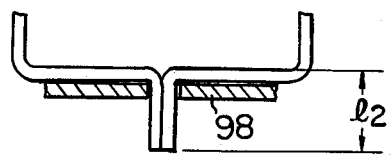
FIG. 5C is a schematic illustration of an example of a conventional seal in such a shape as to put one's hands flat together.

A strip piece of film 1 is formed into a tube form in former 2 in such a manner as to envelope articles 3, 3, . . . Both ends of the film 1a, and 1b are lapped and its lapped ends are folded as shown in FIG. 5B. Then at this state film 1 is sent to the feed passage 4, and on heat sealing band 5. In that case, film 1c which has a melting point m (FIG. 6) lower than the film 1 is laminated on inner side of the film 1, and films 1c and 1c are brought into contact with each other.

Figure 6:
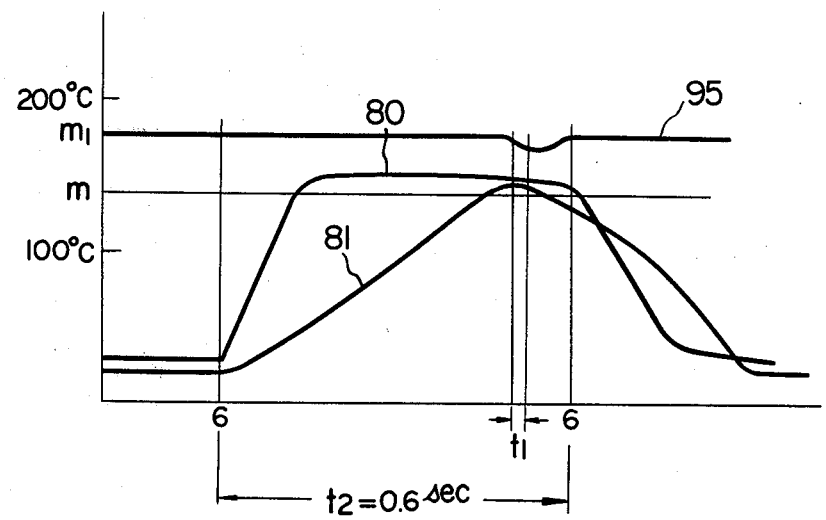
FIG. 6 is a graph showing a relation of temperature to time of a sealed portion.

On the other hand, electricity is sent from the electrode plate 29, and 29, through the slip elements 29a, 29a . . . shown in FIG. 4 and the outer ring of the electrode pulleys 6, and 6 to the heat sealing band 5. Thus the heat sealing band 5 between a pair of electrode pulleys 6 and 6 is charged with electricity. The lower portion of the heat sealing band 5 is very long as compared with the length of the upper portion of the heat sealing band between the pair of the electrode pulleys, and therefore has so high an electric resistance that electricity cannot appreciably flow. Consequently, electricity flows substantially through only an upper portion of the heat sealing band 5 which runs along the passage 4 and heat is generated at a temperature higher than the melting point m as shown by curve 80 in FIG. 6, and by its heat the both ends 1a and 1b of the strip films 1 which are folded into a tube form are heated while passing along the path between electrode pulleys 6, 6 in the long time $t_2$ as shown in FIG. 6 and heated above melting point m as shown by curve 81 in FIG. 6 and melted and sealed. In FIG. 6, the abscissa is time, and the ordinate is temperature. As above-mentioned, the film which is formed into a tube form and whose ends are sealed with each other and containing articles 3, 3 . . . are sent rightward in FIG. 1 through belt 30, receiving belt 33, and 33 and press belt 40, then sealed and cut in the transverse direction by bottom sealer 70, 71, and delivered.

In the above embodiment of this invention, in place of a sealing system in which ends of film are put in such a shape as to put one's hands flat together, another sealing system in which ends of film are joined facing each other (lapping seal) can be employed. For this purpose, a former which forms strip film as shown in FIG. 5A can be employed.

Figure 7A:
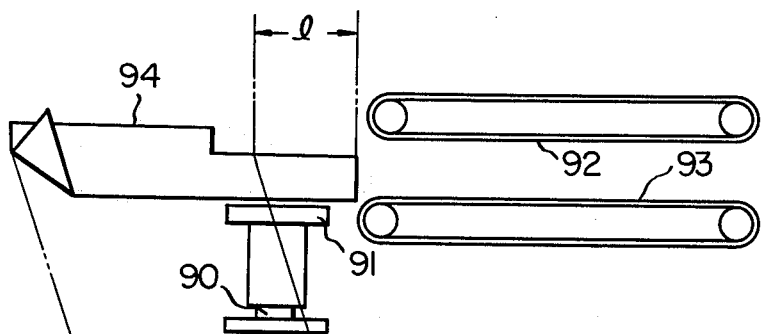
Figure 7B:
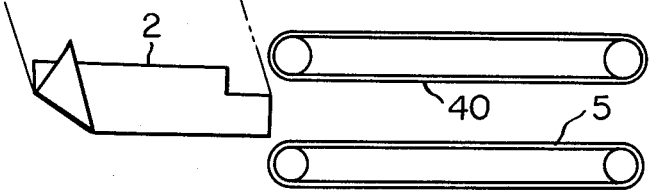

As above-mentioned, according to this invention, a sealing system can be freely selected from a sealing system in which ends of film are put in such a shape as to put one's hands flat together or a sealing system in which ends of film are joined facing each other (lapping seal). Further, a wrapping machine of this invention is provided with a press belt which is mounted above the heat sealing band. The press belt can be used as a tubing belt, and therefore the total length of the machine can be lessened by length l, $l_1$ as shown in FIGS. 7B and 8B. Further, in a packing machine of this invention, orientation of articles can be kept stable with the grip belt so that supplementary means such as a guide plate is unnecessary and thereby to that extent the device can be simplified. Further in a packing machine of this invention, as electric current is passed directly through the heat sealing band, and ends of film to be sealed are brought into contact with the heat sealing band for long time, the ends of strip film can be sealed certainly and efficiently at comparative temperature and temperature control can be done easily.

An example of a test of such a machine:
Material of the heat sealing band; stainless steel
Shape of the heat sealing band;
 width 6 mm;
 thickness 0.13 mm;
 length about 1.2 m
Running speed of the heat sealing band; about 30 m/min.

What is claimed is:

1. A wrapping maching comprising:
 forming means for forming a film strip into a tube with a seam;
 a pair of horizontally adjacent receiving belts for receiving the formed film strip;
 an elongated heat sealing band having a portion disposed coplanar between said receiving belts;
 a press belt adapted to press said tube forms against said heat sealing band;
 a pair of electrode pulleys at the ends of said heat sealing band portion;
 said electrode pulleys comprising;
 a shaft;
 a bearing on said shaft;
 an insulating ring on said bearing;
 a conductive ring on said insulating ring;
 a slip element between said electrode and said conducting ring;
 electrode means for applying an electric current through said pulleys to said coplanar portion of said heat sealing band;
 said heat sealing band passing over said conductive rings on said pulleys whereby electric current is conducted to the heat sealing portion of said band;
 whereby said heat sealing band seals the seam on said film tube.

2. The wrapping machine according to claim 1 wherein said receiving belts and said heat sealing band are driven in the same direction at the same speed.

3. The wrapping machine according to claim 1 wherein said heat sealing band passes over a series of idler rollers and pinch rollers; said heat sealing band having a total length which is very long compared to the heat sealing length.

* * * * *